June 24, 1930.  W. S. BAYLIS  1,766,211
PROCESS OF PURIFYING GASOLINE
Original Filed May 22, 1926
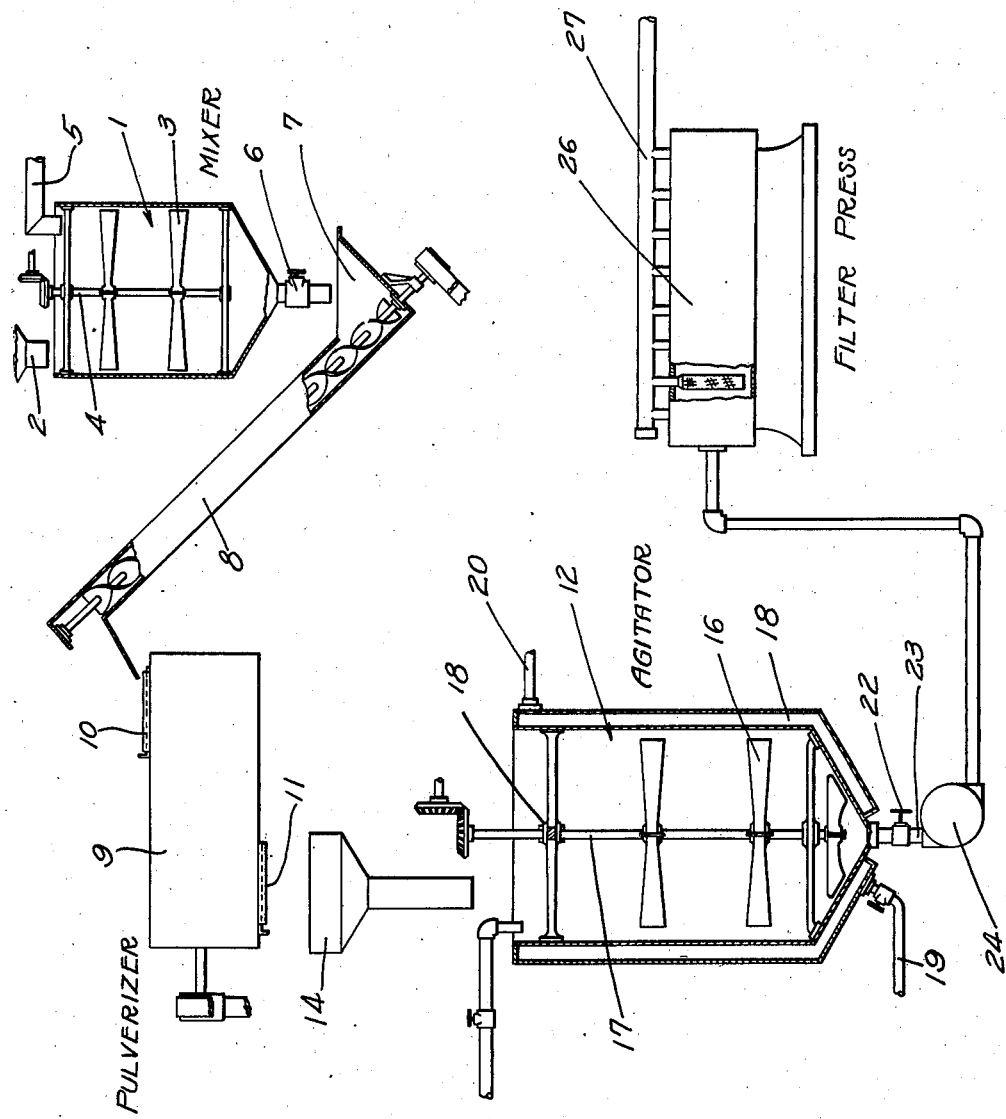
INVENTOR
WALTER S. BAYLIS
By
Ford V. Harris
ATTORNEY Patented June 24, 1930

1,766,211

UNITED STATES PATENT OFFICE

WALTER S. BAYLIS, OF LOS ANGELES, CALIFORNIA, ASSIGNOR, BY MESNE ASSIGNMENTS, TO FILTROL COMPANY OF CALIFORNIA, OF LOS ANGELES, CALIFORNIA, A CORPORATION OF CALIFORNIA

PROCESS OF PURIFYING GASOLINE

Original application filed May 22, 1926, Serial No. 110,960. Divided and this application filed September 19, 1927. Serial No. 220,385.

My invention relates to a method of treating liquids to remove the impurities therefrom, and is particularly applicable to the petroleum industry for purifying the various petroleum products such as gasoline, this application being a division of my application entitled Decolorizing material and method of producing same, filed May 22, 1926, Serial No. 110,960.

In the following description the invention will be described in connection with the purification of gasoline, but it should be understood that I do not thereby wish to limit this invention.

Gasoline is decolorized and purified before it is placed on the market in order to remove certain of the unsaturated and aromatic hydrocarbons and resinous matters, together with any other impurities which should be removed from the gasoline.

It is an object of this invention to provide a novel and improved process of treating gasoline (or other fluid) whereby it is more quickly and more thoroughly decolorized and refined.

Other objects and advantages will be pointed in in the ensuing description.

In the drawing which accompanies this specification I have illustrated an apparatus in which the process of the invention may be conducted.

Referring in detail to the drawing, decolorizing clay is introduced into a mixer 1 by means of a spout 2. This decolorizing clay is preferably a clay which has had substantially all of the impurities especially those of a basic character removed therefrom to give it the desirable adsorbent qualities and which has acid, such as sulphuric acid, combined with it. It is very important to the invention that the decolorizing clay be completely dry, not only in the sense that it is free from water but in the sense that substantially all of the water of crystallization has been driven therefrom. The decolorizing material is, of course, in a thoroughly pulverized condition.

In the mixer 1 the decolorizing clay is very intimately mixed with an acid which is substantially free from water, by the action of mixing paddles 3 which are rotated by a vertical shaft 4. As an acid I prefer to use sulphuric acid which is introduced into the mixer 1 by means of a pipe 5. It should be understood that equivalent acids may be used in place of sulphuric acid. I find it most efficient to mix from four to six per cent sulphuric acid by weight with the decolorizing clay. The sulphuric acid, since it is substantially free from water and since the decolorizing clay is substantially free from water, has practically no reaction on the clay; therefore, a mechanical mixture of free sulphuric acid and decolorizing clay is obtained.

The mixing paddles 3 are operated until a very thorough and intimate mixture of the sulphuric acid and the decolorizing clay is obtained. After this intimate mixing, a valve 6 in the lower part of the mixer 1 is opened and the mixture is delivered to a hopper 7 of a suitable conveyor 8. The mixture is delivered by the conveyor 8 to a suitable pulverizer which is in the drawing shown in the form of a tube mill pulverizer 9. This tube mill pulverizer 9 has a door 10 closing an opening through which the mixture is delivered to the interior of the drum 11. The tube mill is set into operation, the drum 11 being rotated until the mixture is completely pulverized.

Liquid to be treated, which in this illustration of the invention is water free gasoline, is delivered to an agitating tank 12 by means of a pipe 13. The mixture of decolorizing clay and acid is delivered to the agitator through a hopper 14, the mixture being passed into the hopper 14 from the tube mill pulverizer 9. The amount of mixture required to decolorize a certain liquid depends more or less on the liquid itself. It is within the knowledge of anyone skilled in the art, and therefore these proportions will not be given here and furthermore it would be impossible to state proportions which would apply to various liquids. The mixture of decolorizing clay and acid is thoroughly and intimately mixed with the gasoline by means of agitating paddles 16 which are rotated by a vertical shaft 17, this shaft 17 being supported by bearings 18. It is often desirable to heat the gasoline during agitation and for accomplishing this the agitator is provided with a steam jacket 18 having a steam inlet pipe 19 and a steam outlet pipe 20. Steam is circulated through the jacket 18 and the gasoline is heated during agitation. The action of the decolorizing clay is to adsorb from the gasoline the impurities such as unsaturated and aromatic hydrocarbons. The acid cooperates fully with the decolorizing clay and it is found that it renders the purifying action much more efficient. At this time I cannot say whether the free acid has an effect on the decolorizing clay during the purification process or whether the acid has an effect on the gasoline which increases the efficiency of the decolorization of the gasoline.

After the gasoline has been mixed with the decolorizing clay and the acid for a sufficient length of time to effect a thorough purification, agitation is arrested, and a valve 22 of an outlet pipe 23 is opened. The outlet pipe 23 has a pump 24 which is set into operation at this time and which delivers the mixture of gasoline, decolorizing clay, and acid to a filter press 26 in which the gasoline is separated from the decolorizing clay, acid, and impurities which have been adsorbed thereby. The gasoline passes from the filter press 26 through an outlet pipe 27, the decolorizing clay, acid, and impurities being retained in the filter press.

I claim as my invention:

1. A process of treating water free gasoline which comprises: applying a decolorizing clay which has no free water or water of crystallization and anhydrous sulfuric acid simultaneously to the said gasoline and thereafter separating the clay from the liquid.

2. A process of treating water free gasoline which comprises: agitating simultaneously therewith a decolorizing clay which is substantially dry and which has no water of crystallization and a substantially anhydrous free acid until substantial decolorization of the gasoline takes place and then separating the clay from said gasoline.

3. A process of treating water free gasoline which comprises: agitating with said gasoline an intimate mixture of a dry decolorizing clay which is substantially free from basic impurities and which contains no water of crystallization with substantially anhydrous free sulfuric acid until substantial decolorization of the gasoline takes place, and then separating the gasoline from the clay.

4. A process of decolorizing water free gasoline which comprises: agitating therewith until substantial decolorization occurs a mixture of a dry decolorizing clay having no water of crystallization with four to six percent. by weight of a sulfuric acid containing substantially no water, and thereafter separating the clay from the gasoline.

5. A process of decolorizing water free gasoline which comprises: agitating therewith until substantial decolorization takes place a mixture of dry decolorizing clay substantially free of water of crystallization and of basic impurities with four to six percent by weight of anhydrous sulfuric acid, and thereafter separating the clay from the gasoline.

In testimony whereof, I have hereunto set my hand at Chicago, Illinois, this 8th day of September, 1927.

WALTER S. BAYLIS.